United States Patent

Jackson et al.

[15] 3,686,588

[45] Aug. 22, 1972

[54] IMPROVEMENTS RELATING TO THE OUTPUT POWER DERIVED FROM PHASE MODULATING

[72] Inventors: Brian Jackson; John Eric Barrett, both of Wells, England

[73] Assignee: EMI Limited

[22] Filed: Oct. 29, 1970

[21] Appl. No.: 85,175

[30] Foreign Application Priority Data

Nov. 19, 1969 Great Britain..........56,533/69

[52] U.S. Cl...................332/9 R, 325/126, 325/446, 332/11, 332/29

[51] Int. Cl. ..............................................H03c 3/12

[58] Field of Search ........332/9, 10, 11, 29; 325/125, 325/126, 446

[56] References Cited

UNITED STATES PATENTS

| | | | |
|---|---|---|---|
| 3,349,342 | 10/1967 | Garver | 332/11 X |
| 3,435,342 | 3/1969 | Burnsweig et al. | 332/10 X |

*Primary Examiner*—Alfred L. Brody
*Attorney*—Fleit, Gipple & Jacobson

[57] ABSTRACT

A phase modulator according to the invention includes means for producing quadrature components of a carrier wave each phase reversal modulated by respective digital pulse signals, means for applying the components to respective adjacent terminals of a four terminal hybrid coupler, and means responsive to the digital pulse signals for selecting the appropriate one of the other terminals of the coupler to derive an output therefrom equivalent to the resultant of the quadrature components of the carrier wave.

3 Claims, 3 Drawing Figures

Inventor
Brian Jackson
John E. Barrett
By Fleit, Gipple & Jacobson
Attorneys

IMPROVEMENTS RELATING TO THE OUTPUT POWER DERIVED FROM PHASE MODULATING

The present invention relates to phase modulators in which a carrier wave is modulated by digital pulse signals.

An efficient form of modulation of a carrier wave by digital pulse signals is phase-reversal modulation, in which for example a space is represented by zero phase change of the carrier, and mark by 180° phase change of the carrier. It is known to combine two such modulated carrier waves orthogonally so that if the bit rate is the same and synchronous for each channel, then two bits of information are sent in each bit period with no increase in bandwidth. A known method of generating such a doubly modulated carrier wave is one in which the unmodulated carrier wave is split into two parts of equal power, for example by a 3 db coupler; each part is individually phase-reversal modulated by separate baseband signals, for example by means of diode switches which insert or remove a piece of transmission line or waveguide half a carrier wavelength long; and finally the two separately modulated carrier waves are combined in a phase quadrature relationship, for example by another 3 db coupler.

However the above method of combination results in a wastage of half the available carrier power and it is an object of the present invention to provide an improved phase modulator in which this disadvantage is substantially overcome.

According to the present invention there is provided a phase modulator including means for producing two quadrature components of a carrier wave each phase reversal modulated by respective digital pulse signals, means for applying said two components to a respective one of two adjacent terminals of a four terminal hybrid coupler, and means responsive to said digital pulse signals for selecting the appropriate one of the other two terminals of said coupler for deriving an output therefrom equivalent to the resultant of the quadrature components of said carrier wave.

Figure 1:
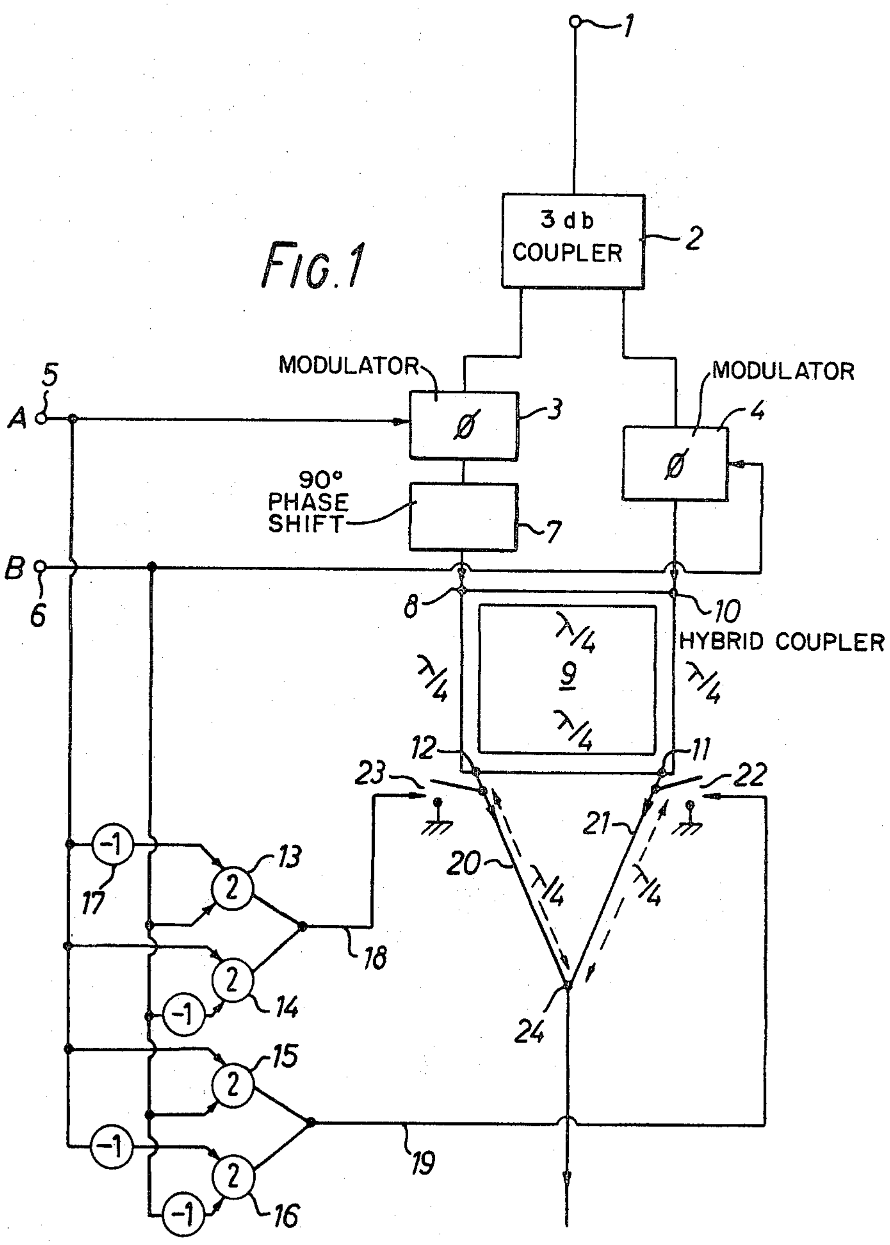
Figure 3:
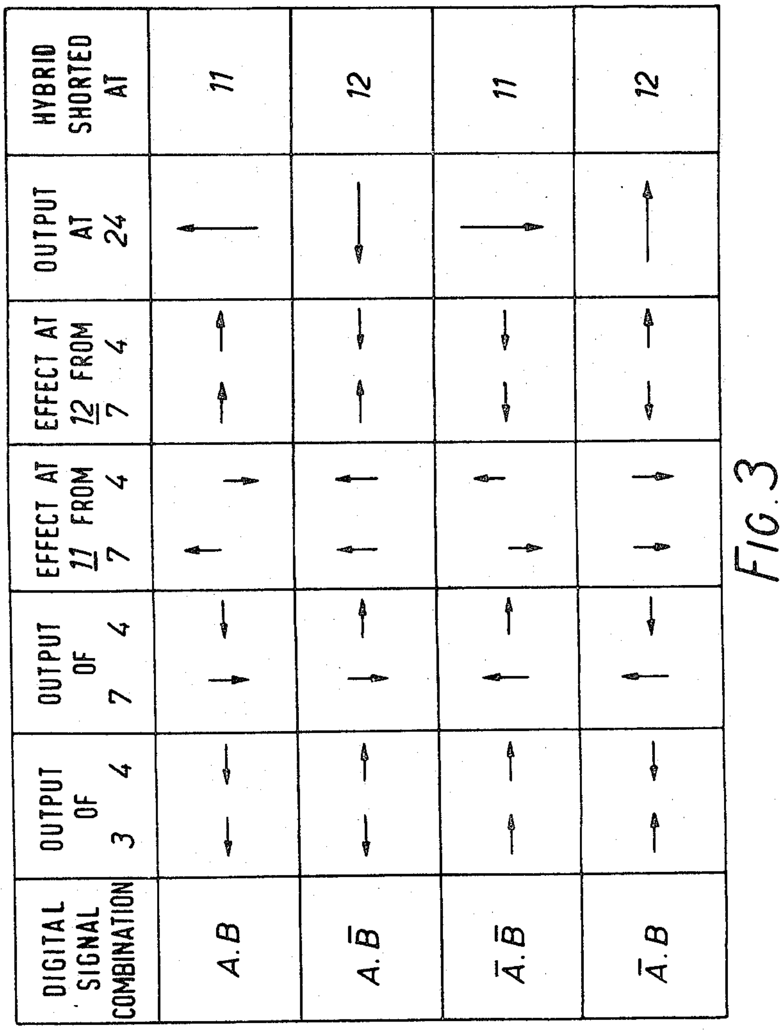
Figure 2:
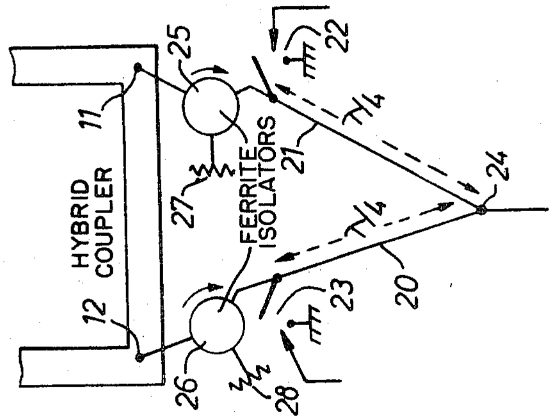

In order that the present invention may be fully understood and readily carried into effect it will now be described with reference to the accompanying drawings of which:

FIG. 1 shows one example of a phase modulator according to the present invention in diagrammatic form, FIG. 2 shows a modification which can be made to the phase modulator of FIG. 1, and FIG. 3 is a table to be used in explaining the operation of the phase modulator.

With conventional phase reversal modulation of two carrier wave components, the modulated components being arranged to be in phase quadrature, there is always one vector at 0° or 180°, and another at 90° or 270°, of equal amplitude. It follows that the single resultant vector will take one of four phases, namely 45°, 135°, 225° or 315° (i.e., relative phases 0°, 90°, 180° or 270°). The problem which the present invention seeks to substantially overcome is to combine the two phase reversal modulated components in phase quadrature without the wastage of half the available carrier power, so that the resultant has an amplitude $\sqrt{2}$ times either of the constituent vectors, that is double their powers.

A carrier wave of which two components are to be phase reversal modulated is applied to a terminal 1 and thence to a 3 db coupler 2, from which two half power components are derived which are passed to respective conventional phase reversal modulators 3 and 4. The digital pulse baseband signals (designated A and B) are passed respectively to terminals 5 and 6 and thence to modulators 3 and 4 respectively. Each of modulators 3 and 4 may comprise means for inserting a piece of transmission line half a carrier wavelength long into the respective signal path by switches constituted by diodes rendered conducting in response to a digital signal representing a mark. Thus the phases of the signals emanating from modulators 3 and 4 are either 0° or 180° dependent on whether the digital baseband pulse signal is a space or a mark.

The output from modulator 3 is passed through a 90° phase shifter 7, and thence to a terminal 8 of a four-port hybrid coupler 9, the output from modulator 4 being applied directly to terminal 10 of coupler 9. Thus the signals applied to terminals 8 and 10 have phases respectively of either −90° or +90° and either 0° or 180°. The branches of coupler 9 have phase lengths of λ14 where λ is the wavelength of the carrier wave, and it can be shown that if a signal is applied to terminal 8 then half power signals in phase quadrature appear at terminals 11 and 12; and if an in phase signal is applied to terminal 10 then half power signals in phase quadrature again appear at terminals 11 and 12, but each in phase quadrature with the respective signal due to the signal applied to terminal 8. Thus as in the example of the present invention the signal applied to terminal 8 is always in phase quadrature to the signal applied to terminal 10, they will be in phase at one of terminals 11 and 12, and out of phase at the other. If both the modulations are due to marks (i.e. the input signals have phases of +90° and 180°) or both due to spaces (i.e. the input signals have phases of −90° and 0°) then a full power output appears at terminal 12, and if one modulation is due to a mark and the other due to a space (i.e. phases of +90° and 0° or −90° and 180°) then a full power output appears at terminal 11, the full power being equivalent to signals representing each input combined in phase quadrature as required.

Thus it is arranged that logic circuits responsive to the input digital signals select the appropriate output terminal of coupler 9 accordingly. Four taps are taken from each of terminals 5 and 6 to a respective one of four AND gates 13, 14, 15 and 16, gates such as 17 being distributed in the taps as shown and opened in response to a space. Thus an output appears on line 19 from AND gates 15 and 16 if either both digital pulses are marks or both spaces (these conditions being designated A.B and $\bar{A}$.$\bar{B}$ respectively); and on line 18 from AND gates 13 and 14 if one is a mark and the other a space (these conditions being designated $\bar{A}$.B and A.$\bar{B}$ respectively). Lines 20 and 21 are taken from terminals 12 and 11 respectively to a common point 24, switches 23 and 22 (which may be constituted by diodes rendered conducting in response to a signal on the respective line 18 or 19) being provided for selectively short circuiting these lines and the respective terminal 11 or 12 to ground at a point λ/4 4 distant from common point 24. A signal on line 18 is caused to close switch 23 so that terminal 12 is decoupled from point

24, switch 22 remaining open so that signal power can flow from terminal 11 to point 24; and vice versa when a signal appears on line 19, which is caused to close switch 22 permitting power to flow from terminal 12 to point 24. The full power output from point 24 can be passed to a power amplifier or any other load. In order to improve the operation of the device over a wide band of frequencies it is desirable to provide a good match to the terminals 11 and 12 of the hybrid 9 at all times. This can readily be accomplished as is shown in FIG. 2 by providing a ferrite isolator 25 between terminal 11 and switch 22 and a ferrite isolator 26 between terminal 12 and switch 23. These isolators may for example be constructed in strip line using three-port circulators with one port of each terminated in matched load 27 or 28.

FIG. 3 is a table showing the relative amplitudes and directions of the current vectors constituting the signals at the various points in the phase modulator shown in FIG. 1 for the four different combinations of baseband digital signals applied to terminals 5 and 6. If the amplitude of the carrier wave current applied to terminal 1 is I in a load of impedance R (which must also be the impedance of the load presented to 24), the signals applied to modulators 3 and 4 will have an amplitude of I/2 in loads of 2R and the amplitude of the vectors in FIG. 2 shown by small arrows is also I/2. The amplitude of the vector of the output signal at terminal 24 is then I, and have relative phase shifts of either 0°, 90°, 180° or 270° depending on whether the digital signal combination is designated A.B, $\overline{A}$.B, $\overline{A}.\overline{B}$ or $\overline{A}.\overline{B}$ respectively.

It will be appreciated that the 90° phase shifter 7 could be inserted before the phase modulator 3 to achieve the same result. Alternatively if the 3 db coupler 2 is of a quadrature hybrid type then the 90° phase shifter 7 will be unnecessary.

What we claim is:

1. A phase modulator including means for producing two quadrature components of a carrier wave each phase reversal modulated by respective digital pulse signals, means for applying said two components to a respective one of two adjacent terminals of a four terminal hybrid coupler, and means responsive to said digital pulse signals for selecting the appropriate one of the other two terminals of said coupler for deriving an output therefrom equivalent to the resultant of the quadrature components of said carrier waive.

2. A phase modulator according to claim 1 in which said means for producing two quadrature components of a carrier wave includes means for deriving two half power components of said carrier wave, means for phase reversal modulating each half power component and means for shifting the phase of one modulated half power component by 90°.

3. A phase modulator according to claim 1 in which each of the other terminals of said coupler is coupled to an output terminal by a respective quarter wavelength transmission line, and said means for selecting the appropriate one of the other terminals includes means for short-circuiting to earth one of said other terminals in response to the nature of said digital pulse signals.

* * * * *